United States Patent Office 3,275,483
Patented Sept. 27, 1966

---

3,275,483
REACTION PRODUCTS OF NITRILE CONTAINING DECABORANES AND OLEFINIC RUBBER
Murray S. Cohen, Morristown, Marvin M. Fein, Westfield, Joseph Green, Dover, and George J. Donovan, Morristown, N.J., assignors to Thiokol Chemical Corporation, Bristol, Pa., a corporation of Delaware
No Drawing. Filed Oct. 21, 1960, Ser. No. 64,217
17 Claims. (Cl. 149—22)

This invention relates to reaction products of various olefinic rubbers with nitrileboranes.

It has now been found that certain nitrileboranes can be combined with various rubbers, synthetic and natural, to form a solid material of high boron content suitable for use as a propellant fuel for rocket power plants and other jet propelled devices.

The fuels of this invention when incorporated with suitable oxidizers, such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse. Appreciable increases in performance will result from the use of the higher specific impulse materials. The fuels of this invention when incorporated with oxidizers are capable of being formed into a wide variety of grains, tablets and shapes all with desirable mechanical and chemical properties. Propellants produced by the methods described in this application burn uniformly without disintegration when ignited by conventional means, such as the pyrotechnic type igniter and are mechanically strong enough to withstand ordinary handling.

According to this invention it was discovered that bis (nitrile) decaboranes or bis(nitrile) alkyldecaboranes will react with olefinic rubbers.

Bis(nitrile) decaboranes can be prepared by the method described in copending application Serial No. 690,407, filed October 15, 1957, now U.S. Patent No. 3,201,450, of Murray S. Cohen et al. Suitable bis(nitrile) decaboranes disclosed in that application include those prepared by reacting 0.01 to 14 moles of a cyano alkane having from 1 to carbon atoms per mole of decaborane at a temperature of 0° to 180° C.

Bis(nitrile)alkyldecaboranes can be prepared by the methods described in copending application Serial No. 751,804, filed July 29, 1958, now U.S. Patent No. 3,030,- 407, of Edmond L. Graminski et al. This application discloses the preparation of solid reaction products of a lower alkyl decaborane and a cyano alkane by reacting a lower alkyl decaborane with from 1 to 15 moles, per mole of lower alkyl decaborane, of a cyano alkane containing from 1 to 4 carbon atoms in the alkyl radical at a temperture of about 50° to 100° C.

The olefinic rubbers useful in this invention include liquid rubbers and solid rubbers plasticized to a liquid state and include natural rubber and various synthetic rubbers, for example, liquid depolymerized natural rubber (DPR), butadiene-styrene copolymers (GR-S), butadiene-acrylonitrile copolymers (nitrile rubbers), butadiene-acrylic acid copolymers, polybutadiene, and isobutylene-isoprene copolymers (butyl rubbers). By the term "a rubber" it is meant to include such compositions. These olefinic rubbers are well known and are described at length in copending application Serial No. 749,558, filed July 18, 1958, now abandoned, of Jack D. Breazeale et al.

The ratio of reactants can be varied widely, generally being in the range of 0.1 to 10 moles of bis(nitrile) decaborane or bis(nitrile)alkyldecaborane per mole of rubber and preferably in the range of 0.5 to 2 moles of borane per mole of rubber. The reaction temperatures can vary videly, generally being from 25° to 200° C., preferably from 25° to 100° C. The reaction pressure can vary from subatmospheric to several atmospheres, although atmospheric pressure reactions are convenient. The reaction generally requires about 1 to 24 hours, depending upon the ratio of reactants, the particular reactants and solvents employed, and the temperature and pressure of the reaction.

Although the reaction will proceed in the absence of a solvent, best results are obtained, especially where solid reactants are employed, by carrying out the reaction in a solvent inert with respect to the reactants. Such solvents include aliphatic hydrocarbon solvents, such as n-pentane, hexane and heptane, aromatic hydrocarbon solvents such as benzene, toluene and xylene, cycloaliphatic solvents such as cyclohexane and methylcyclopentane and oxygenated organic solvents such as dioxane, ethyl acetate, and diisopropyl ether. The amount of solvent can vary widely but generally ranges up to about 70 times the weight of the reactants. When a solvent is employed, it is preferred to carry out the reaction at the reflux temperature of the solvent.

The process of this invention is illustrated in detail by the following examples.

*Example I*

The bis(acetonitrile)decaborane employed as a reactant in this example was prepared by adding to 38 milliliters of benzene 4.9 grams (0.04 mole) of decaborane and 4.1 grams (0.1 mole) of acetonitrile and heating the resulting admixture to reflux (about 81° C.) and maintaining this reflux temperature for 48 hours. The reaction proceeded slowly with gas evolution and formation of a white precipitate. The evolved gas was identified as hydrogen by mass spectrometry. The gas evolution is consistent with the equation:

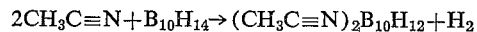
$$2CH_3C\equiv N + B_{10}H_{14} \rightarrow (CH_3C\equiv N)_2B_{10}H_{12} + H_2$$

Chemical analysis of the separated and purified white precipitate is also consistent with the above equation as is shown below:

Calculated: H=8.92, N=13.86, B=53.4. Found: H=8.23, N=13.3, B=53.2.

The above prepared bis(acetonitrile)decaborane in the amount of 4.04 grams (0.02 mole) was dissolved in 60 milliliters of benzene in a 100 milliliter round bottom flask equipped with a magnetic stirrer and a reflux condenser fitted with a drying tube. To this solution were added 1.36 grams (0.02 mole) of a crude natural rubber depolymerized to a high viscosity liquid by continuous mechanical milling. The reaction mixture was heated to reflux and maintained at this temperature for 24 hours. The solution changed color and no gassing was observed. The rubbery precipitate which formed was separated and dried in a vacuum oven overnight. The product had then become resinous and was thermally stable to 300° C. An infrared spectrum of the resinous material indicated that one mole of bis(acetonitrile)decaborane had interacted with one mer unit of the natural rubber as evidenced by the absence of the characteristic olefinic absorption band and the presence of a large BH absorption band. The reaction of bis(acetonitrile)decaborane and natural rubber thus proceeds as follows:

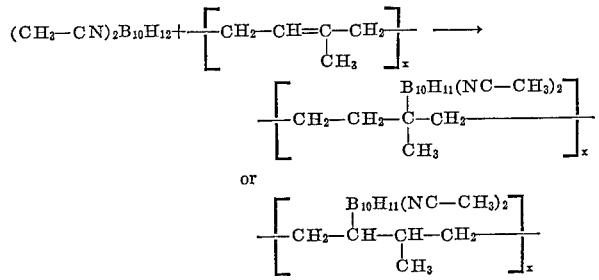

*Examples II and III*

The experiments of these examples were carried out in a manner similar to that of Example I except that the reactant proportions were different. The results are summarized below:

| Rubber, grams | Borane, grams | Physical Properties |
| --- | --- | --- |
| 2.6 | 4.04 | Cork-like consistency, stable to 300° C. |
| 2.0 | 2.0 | Mixture of reactants and products. |

*Example IV*

A 100 milliliter flask was equipped with a magnetic stirrer and a reflux condenser fitted with a drying tube. Into this flask were placed about 25 milliliters of benzene, 2.6 grams (0.013 mole) of bis(acetonitrile) decaborane prepared as described in Example I, and 1 gram (0.013 mole) of Hycar 1312, a butadiene-acrylonitrile copolymer containing 33% acrylonitrile and about 67% butadiene, having a specific gravity of 0.97 at 25° C. and a Brookfield viscosity [No. 4 spindle at 60° C. (cps.)] at 30° C. of 100,000. The reaction mixture was heated to benzene reflux and maintained at this temperature for 24 hours. White solids were formed without concomitant gas evolution. After drying in a vacuum oven, the solids were resinous in nature and were thermally stable to 240° C. The infrared spectrum of this material indicates that one mole of bis(acetonitrile)decaborane interacted with one double bond in the copolymer. This is evidenced by the fact that the characteristic absorption bands of olefinic compounds are absent and large BH bonds are present.

*Example V*

This experiment was carried out in a manner similar to that of Example IV except that the reactant proportions were different, i.e. one gram of Hycar 1312 was reacted with one gram of bis(acetonitrile)decaborane. The product, after drying, had a cork-like consistency and was stable to 300° C.

*Example VI*

A 100 milliliter flask was equipped with a magnetic stirrer and a reflux condenser fitted with a drying tube. Into this flask were placed about 50 milliliters of benzene, 10.1 grams (0.05 mole) of bis(acetonitrile)decaborane prepared as described in Example I, and 2.7 grams (0.05 mole) of Butarez-15, a liquid polybutadiene having a specific gravity of 0.9083 at 60° F. and an SFV viscosity at 100° F. of 1500. The reaction mixture was heated to benzene reflux and maintained at this temperature for 24 hours. Red solids formed and no gassing was observed. The solids, after washing with benzene and drying in a vacuum oven, were resinous in nature and thermally stable to 270° C. The infrared spectrum of this material indicates that one mole of bis(acetonitrile)decaborane interacted with one mer unit of the polybutadiene. This is evidenced by the absence of the characteristic olefinic absorption bands and the presence of a large BH absorption. The reaction of bis(acetonitrile) decaborane and Butarez-15 thus proceeds as follows:

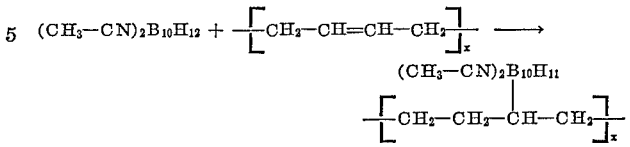

*Examples VII and VIII*

The experiments of these examples were carried out in a manner similar to that of Example VI except that the reactant proportions were different. The results are summarized below:

| Butarez-15, grams | Borane, grams | Physical Properties |
| --- | --- | --- |
| 2.7 | 5.0 | Resin, thermally stable. |
| 1.5 | 1.5 | Resin, darkens at 280° C. |

*Example IX*

The bis(undecanonitrile)decaborane employed as a reactant in this example was prepared by reacting 0.1 mole of undecanonitrile with 0.05 mole of decaborane in 60 milliliters of benzene at reflux temperature for 30 hours during which time 1.3 liters of hydrogen (0.05 mole) was evolved. The solvent and unreacted starting materials were removed at a pressure of 0.15 mm. Hg absolute at 90° C. The bis(undecanonitrile)decaborane product was a viscous liquid soluble in benzene, heptane and carbon disulfide.

Into a 100 milliliter flask equipped with a magnetic stirrer and a reflux condenser fitted with a drying tube were placed about 50 milliliters of benzene, 0.68 gram (0.01 mole) of liquid depolymerized natural rubber and 4.5 grams (0.01 mole) of the bis(undecanonitrile)decaborane prepared as described above. The reaction mixture was heated to benzene reflux and maintained at this temperature for 24 hours. The solution changed color but no gassing or precipitate formation was observed. The solution was concentrated by heating to 80° C. at 0.05 mm. Hg absolute to yield a rubbery residue. The product was tough and had good elongation characteristics.

*Example X*

Into a 100 milliliter flask equipped with a magnetic stirrer and a reflux condenser fitted with a drying tube were placed about 50 milliliters of benzene, 0.54 gram (0.01 mole) Butarez-15, and 4.5 grams (0.01 mole) of the bis(undecanonitrile)decaborane as prepared in Example IX. The reaction mixture was heated to benzene reflux and this temperature was maintained for 24 hours. Again no gassing or precipitate formation was observed. The solution was concentrated by heating to 80° C. at 0.05 mm. Hg absolute to yield a rubbery residue.

*Example XI*

In this experiment, liquid depolymerized natural rubber was reacted successively with two bis(nitrile)decaboranes.

Into a 100 milliliter flask equipped with a magnetic stirrer and a reflux condenser fitted with a drying tube were placed about 50 milliliters of benzene, 0.68 gram (0.01 mole) of liquid depolymerized natural rubber and 0.45 gram (0.001 mole) of bis(undecanonitrile)decaborane. The reaction mixture was heated to benzene reflux and this temperature was maintained for 4 hours. At this point, 1.81 grams (0.009 mole) of bis(acetonitrile)decaborane were added and heating was resumed for an additional 14 hours. An orange precipitate formed which, after drying overnight in a vacuum oven, was a cork-like resin. In similar experiments, the proportions of the two bis(nitrile)boranes were varied and in some the natural rubber was replaced with Butarez-15. The pertinent data are summarized below in Table I.

TABLE I

| Example | Polymer | Polymer (Moles) | $(CH_3CN)_2B_{10}H_{12}$ (Moles) | $(C_{10}H_{21}CN)_2B_{10}H_{12}$ (Moles) | Calc. Boron, Percent | Remarks |
|---------|---------|-----------------|----------------------------------|------------------------------------------|----------------------|---------|
| XII     | Butarez-15 | 0.01 | 0.009 | 0.001 | 38.6 | Resin, insoluble in benzene. |
| XIII    | do      | 0.01 | 0.007 | 0.003 | 32.6 | Do. |
| XIV     | Natural Rubber | 0.01 | 0.007 | 0.003 | 31.3 | Orange resin. |
| XV      | do      | 0.01 | 0.005 | 0.005 | 27.3 | Resin. |

The boron containing solid materials produced by practicing the methods of this invention, can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 5 to 35 parts by weight of boron containing material and from 65 to 95 parts by weight of oxidizer are present in the final propellant composition. In the propellant, the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin generally of the urea-formaldehyde or phenol-formaldehyde type, the function of the resin being to given the propellant mechanical strength and at the same time improve its burning characteristics. Thus, in manufacturing a suitable propellant, proper proportions of finely divided oxidizer and finely divided boron containing material can be admixed with a high solids content solution of partially condensed urea-formaldehyde or phenol-formaldehyde resin, the proportions being such that the amount of resin is about 5 to 10 percent by weight based on the weight of oxidizer and boron compound. The ingredients are thoroughly mixed with the simultaneous removal of solvent, and following this the solvent free mixture is molded into the desired shape, as by extrusion. Thereafter the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

We claim:

1. A method for the production of an organoboron compound useful as a fuel which comprises reacting a borane selected from the group consisting of bis(nitrile)decaboranes and bis(nitrile)alkyldecaboranes with a material consisting essentially of an olefinic rubber, the bis(nitrile)decaboranes being the reaction products of decaborane with a cyano alkane having from 1 to 12 carbon atoms, and the bis(nitrile)alkyldecaboranes being the reaction products of a lower alkyl decaborane with a cyano alkane having from 1 to 6 carbon atoms.

2. The method of claim 1 wherein the borane is bis(acetonitrile)decaborane.

3. The method of claim 1 wherein the borane is bis(undecanonitrile)decaborane.

4. The method of claim 1 wherein the borane comprises bis(acetonitrile)decaborane and bis(undecanonitrile)decaborane.

5. The method of claim 1 wherein the olefinic rubber is a liquid depolymerized natural rubber.

6. The method of claim 1 wherein the olefinic rubber is a butadiene-acrylonitrile copolymer.

7. The method of claim 1 wherein the olefinic rubber is polybutadiene.

8. The method of claim 1 wherein the olefinic rubber is an isobutylene-isoprene copolymer.

9. The method of claim 1 wherein the borane is bis(acetonitrile)decaborane and the olefinic rubber is liquid depolymerized natural rubber.

10. The method of claim 1 wherein the borane is bis(acetonitrile)decaborane and the olefinic rubber is a butadiene-acrylonitrile copolymer.

11. The method of claim 1 wherein the borane is bis(acetonitrile)decaborane and the olefinic rubber is polybutadiene.

12. The method of claim 4 wherein the olefinic rubber is liquid depolymerized natural rubber.

13. The method of claim 4 wherein the olefinic rubber is polybutadiene.

14. The products produced by the method of claim 1.
15. The products produced by the method of claim 9.
16. The products produced by the method of claim 10.
17. The products produced by the method of claim 11.

References Cited by the Examiner

UNITED STATES PATENTS 3,201,377  8/1965  Green et al. _____ 149—22 X

BENJAMIN R. PADGETT, *Acting Primary Examiner.*

LEON D. ROSDOL, CARL D. QUARFORTH,
*Examiners.*

J. W. WHISLER, L. A. SEBASTIAN,
*Assistant Examiners.*